United States Patent
Inamura

(10) Patent No.: US 6,517,084 B2
(45) Date of Patent: Feb. 11, 2003

(54) CYLINDER HEAD GASKET WITH PARTIAL SEAL COATING

(75) Inventor: Susumu Inamura, Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 09/893,902

(22) Filed: Jun. 29, 2001

(65) Prior Publication Data

US 2002/0017762 A1 Feb. 14, 2002

(30) Foreign Application Priority Data

Aug. 7, 2000 (JP) ........................... 2000-238757

(51) Int. Cl.⁷ .................................................. F02F 11/00
(52) U.S. Cl. ........................ 277/592; 277/591; 277/593; 277/595
(58) Field of Search ................................ 277/590, 591, 277/592, 593, 595

(56) References Cited

U.S. PATENT DOCUMENTS

| 5,267,740 A | * | 12/1993 | Stritzke | 277/316 |
| 5,310,196 A | * | 5/1994 | Kawaguchi et al. | 277/592 |
| 5,393,076 A | * | 2/1995 | Hagiwara et al. | 277/592 |
| 5,408,963 A | * | 4/1995 | Miyaoh et al. | 123/193.3 |
| 5,769,430 A | * | 6/1998 | Udagawa | 277/592 |
| 5,951,021 A | * | 9/1999 | Ueta | 277/593 |
| 6,186,506 B1 | * | 2/2001 | Kionoshita | 277/313 |
| 6,371,489 B1 | * | 4/2002 | Combet et al. | 277/594 |

* cited by examiner

Primary Examiner—Anthony Knight
Assistant Examiner—E Peavey
(74) Attorney, Agent, or Firm—Kanesaka & Takeuchi

(57) ABSTRACT

A cylinder head gasket for an internal combustion engine is formed of a metal plate extending substantially throughout an entire area to be sealed. The metal plate has a plurality of holes corresponding to cylinder bores of the engine, a plurality of beads surrounding the respective holes, and at least one area situated between the holes adjacent to each other. Seal coatings are deposited above the beads in the area. The seal coating has heatproof characteristic and compressibility to strengthen surface pressure of the beads at the area.

7 Claims, 5 Drawing Sheets

CYLINDER HEAD GASKET WITH PARTIAL SEAL COATING

BACKGROUND OF THE INVENTION AND RELATED ART STATEMENT

The present invention relates to a cylinder head gasket with partial seal coatings around the holes for the cylinder bores for securely sealing around the same.

As shown in FIG. 8, a cylinder head gasket 11 with a plurality of holes for the cylinder bores for sealing between a cylinder head and a cylinder block includes on a plate 20 holes 13 for the cylinder bores, oil holes 15, water holes 16, and bolt holes 17, 18. Also, in order to seal combustion gases generated in the combustion chambers, oil circulating through an oil gallery and water in a water jacket, the gasket 11 includes sealing means, such as beads 12 and seal rings 14, for providing adequate sealing pressures for the respective holes to be sealed.

Especially, since high temperature and high pressure combustion gases are generated around the holes 13 for the cylinder bores when the engine is operated, sealing around the holes 13 is especially important. Therefore, the metal plate 20 superior in mechanical strength and durability is used, and beads 12 for forming main sealing portions are arranged around the holes 13 for the cylinder bores to obtain high sealing characteristics by the beads 12.

Also, in the bolt holes 17, 18, head bolts (not shown) are inserted, and the gasket is sandwiched between the cylinder head and the cylinder block (not shown) and is tightened by the head bolts. The bolt holes 17, 18 are arranged to surround the holes 13 for the cylinder bores to securely seal around the cylinder bores.

Incidentally, the tightening pressures by the bolts passing through the bolt holes 17 are applied to the areas or ranges A in FIG. 8, while the tightening pressures by the bolts passing through the bolt holes 18 are applied to the areas B in FIG. 8. The surface pressures are formed by tightening the bolts.

In case the cylinder head gasket 11 in the prior art is installed between the cylinder head and the cylinder block, in case the sealing pressures by the tightening forces of the bolts are too weak, the function for sealing the combustion gas can not be sufficiently obtained. On the other hand, in case the sealing pressures by the tightening forces of the bolts are too strong, it causes the damages to the beads or creep relaxation to the beads. Thus, the sealing characteristics of the beads can not be maintained for a long period of time. Therefore, it is required to tighten the bolts at the adequate tightening pressures, so that the sealing pressures generated by the tightening pressures of the bolts can provide sufficient sealing characteristics for a long time.

For this purpose, when the cylinder head gasket 11 is installed on the cylinder block together with the cylinder head, the bolts are tightened according to the predetermined order. In addition, in order to provide the equal tightening torque by the bolts, the bolts are tightened by a torque wrench to the predetermined torque.

In the gasket 11 as shown in FIG. 8, the sealing area B to which the tightening forces of the bolts passing through the bolt holes 18 are applied is very small as compared to the area A to which the tightening forces of the bolts passing through the bolt holes 17 are applied. Therefore, the surface pressures acted on the area A become very small relative to the surface pressures acted on the area B.

On the other hand, since the engine is made smaller, the holes 13 for the cylinder bores are arranged as close as possible. Thus, the area W between the holes 13 for the cylinder bores comes a severe condition. Namely, in the area W, heat load is high, and combustions of gases different in timing are repeated in the adjacent cylinder bores. Therefore, the beads 12 are likely to cause creep relaxation and damages, so that gas leakage may happen.

In order to solve the problems, it may be thought that an auxiliary bead is formed adjacent to a main bead, and a stopper formed of a metal shim is provided to thereby prevent creep relaxation of the bead.

However, since the auxiliary bead and metal shim are disposed between the sealing portions of the two cylinder bores, it requires an additional area for installing these members. Since the engine has been made to become smaller, the area between the adjacent cylinder bores is made small. Therefore, it is difficult to arrange these members in the small area.

Also, in case the metal shim is used, the metal shim is very thin, i.e. generally 30–100 $\mu$m, which is required to be processed precisely and sandwiched between plates or fixed to a plate. Therefore, there are troubles of taking time for processing the shim and storage to cause high cost.

Further, the metal shim does not have compressibility, and there is no thin metal shim less than 30 $\mu$m. Therefore, in case the shim is used, there are steps at the ends of the shim to form large difference in surface pressures.

The present invention has been made to obviate these problems, and an object of the invention is to provide a cylinder head gasket, wherein the surface pressures of the beads situated between the holes for the adjacent cylinder bores are reinforced to improve the sealing characteristics.

Another object of the invention is to provide a cylinder head gasket as stated above, wherein creep relaxation and damage of the beads are prevented to enhance the durability of the gasket.

Further objects and advantages of the invention are apparent from the following description of the invention.

SUMMARY OF THE INVENTION

A cylinder head gasket of the invention is used for an internal combustion engine with a plurality of cylinder bores. The gasket is formed of a first metal plate extending substantially throughout an entire area to be sealed. The first metal plate includes a plurality of holes corresponding to the cylinder bores of the engine, a plurality of beads surrounding the respective holes for the cylinder bores, and at least one area situated between the holes adjacent to each other. Seal coatings are deposited above the beads in the at least one area. The seal coating has heatproof characteristic, i.e. strong against heat, and compressibility to strengthen the surface pressure of the beads at the at least one area.

The seal coating may be selected from the group consisting of epoxy resin, phenol resin, phenoxy resin, fluoroplastics and polyamideimido. A desired shape of the seal coating may be applied by screen printing or spraying with a mask. The seal coating may have one layer or a plurality of layers. Especially, phenoxy resin has heat resistance over 200° C., and in view of working ability and coating characteristics, phenoxy resin is most preferable.

In the engine having the cylinder bores more than two and arranged linearly, the gasket has the coatings with heat resistance, which are applied to the area between the adjacent holes for the cylinder bores to be subjected to the severe condition where the tightening strength is low. The surface pressures of the beads applied to the area between the holes for the cylinder bores can be reinforced by the coatings with the compressibility. In this reinforcement of the surface pressures, the sealing pressures are increased to have the pressures substantially the same as those in the end areas of the holes for the cylinder bores. Therefore, the sealing can be made securely.

Also, in this coating with compressibility, reaction forces of the cylinder head and the surface pressures applied to the beads between the holes for the cylinder bores are reduced or relieved, so that the creep relaxation and damage of the beads to which the coatings are applied are prevented.

In the gasket, an adequate sealing pressure can be formed at the inner cylinder by the adequate sealing pressures for the cylinders at the longitudinal ends of the engine. Thus, it does not require a large tightening torque, so that the creep relaxation and damage of the beads are prevented.

When the coatings are made by a screen printing, even if the coatings have complicated shapes, the coatings can be made easily. Further, the thickness of the coating can be changed easily by multiple printings, and the coating with an adequate thickness can be formed easily.

Incidentally, the gasket of the invention may be formed of one or a plurality of metal plates. Also, in addition to the above coating, the gasket may have another coating, such as seal coating formed at an outer periphery of the gasket.

In the invention, the seal coatings deposited above the beads in one area are integrally connected together as one unit. In this case, the seal coatings may be entirely deposited on the first metal plate between the beads. When the gasket is formed of one metal plate, the seal coatings are applied on the metal plate. However, when another metal plate is disposed on the metal plate at a side where the beads project, the seal coatings may be applied on the another metal plate facing the beads.

DETAILED DESCRIPTION OF PREFERRED EMBODIMENTS

Now, the specific embodiments of the invention will be explained with reference to the drawings.

Figure 1:
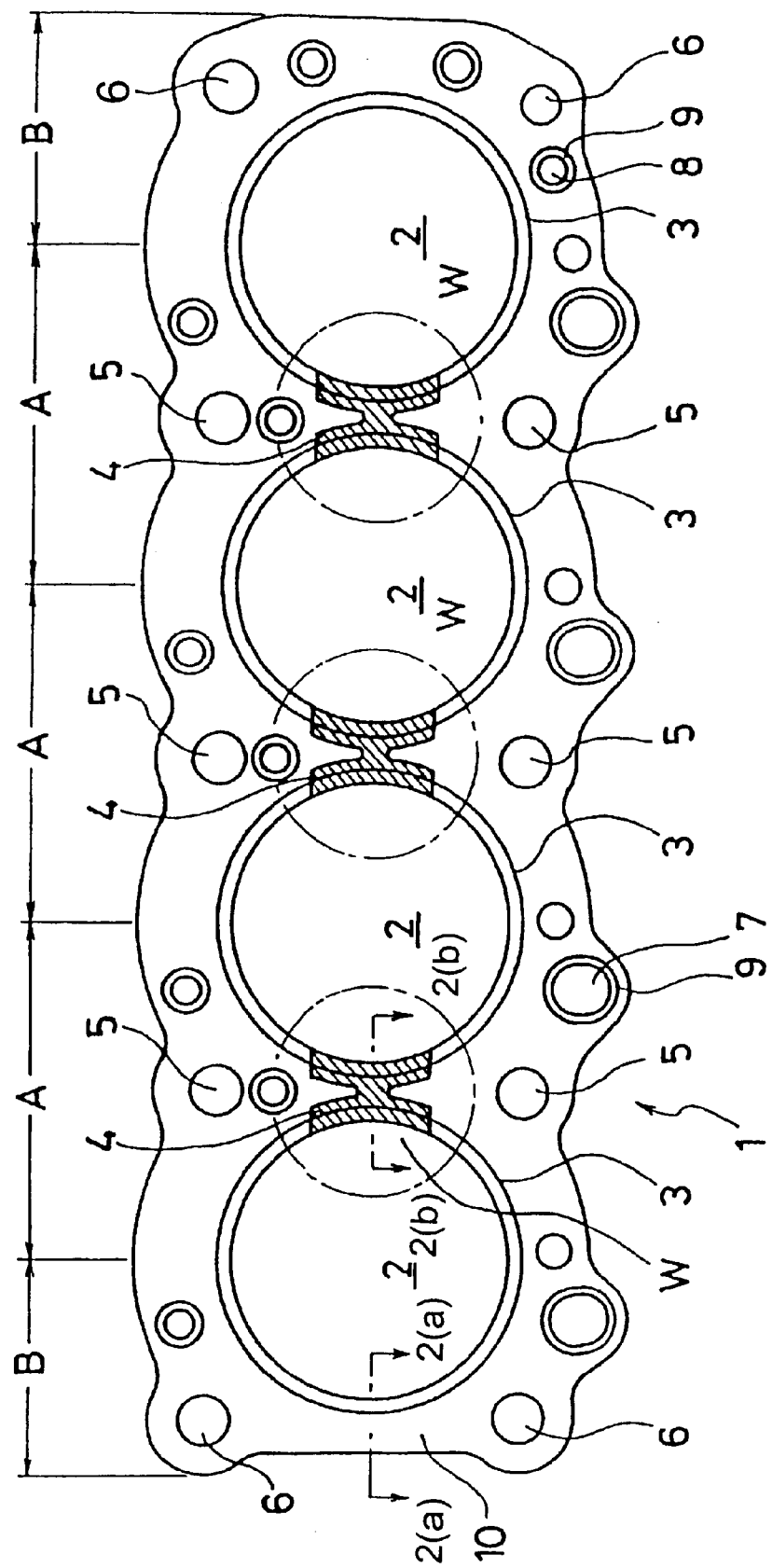
FIG. 1 is a plan view of a first embodiment of a cylinder head gasket with multiple cylinders of the invention.

As shown in FIG. 1, a cylinder head gasket 1 for an engine with a plurality of cylinder chambers is designed to seal combustion chambers arranged linearly. The gasket 1 includes a base plate 10 having therein holes, such as holes 2 for cylinder bores, oil holes 7, water waters 8, bolt holes 5, 6. Also, the base plate 10 includes beads 3 around the peripheries of the holes 2 for the cylinder bore, and seal rings 9 around the peripheries of the oil holes 7 and water holes 8.

In the bolt holes 5, 6, bolts (not shown) are inserted after the cylinder head gasket is sandwiched between a cylinder head and a cylinder block (both not shown), and the bolts are tightened. The bolt holes 5, 6 are generally arranged around the holes 2 for securely sealing around the cylinder bores.

Figure 2A:
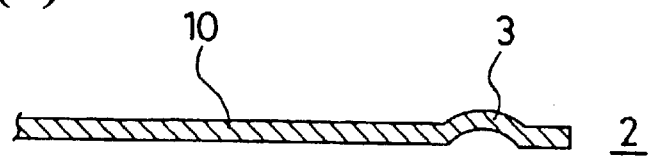
FIGS. 2(a) and 2(b) are enlarged sectional views taken along line 2(a)—2(a) and line 2(b)—2(b) in FIG. 1, respectively.
Figure 2B:
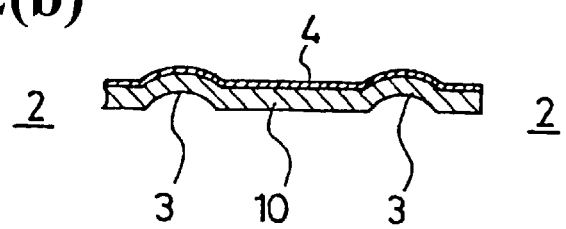
Figure 3:
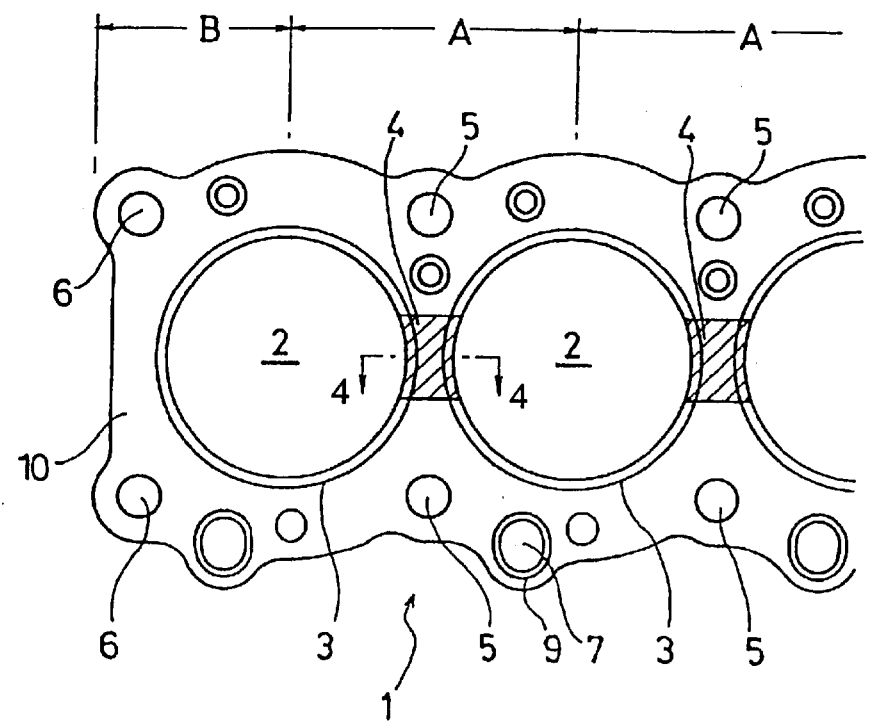
FIG. 3 is a plan view of a part of a second embodiment of the cylinder head gasket of the invention.
Figure 4:
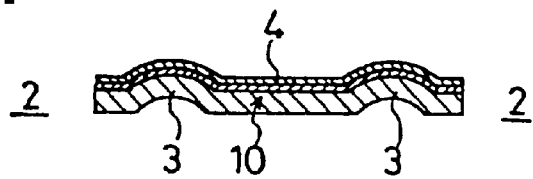
FIG. 4 is an enlarged sectional view taken along line 4—4 in FIG. 3.
Figure 5:
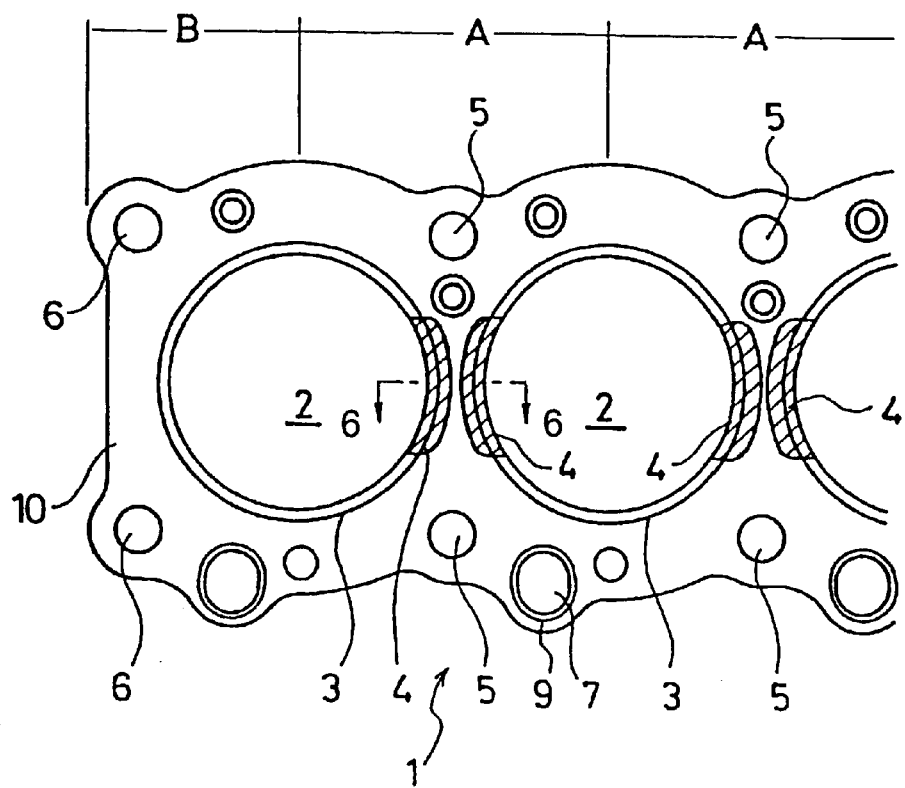
FIG. 5 is a plan view of a part of a third embodiment of the cylinder head gasket of the invention.
Figure 6:
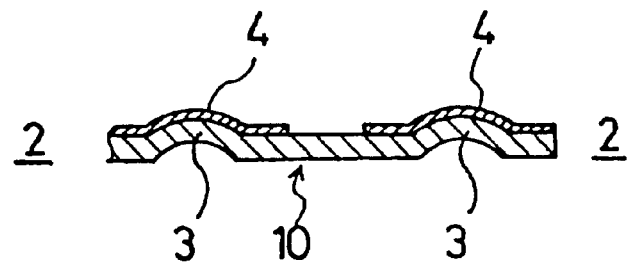
FIG. 6 is an enlarged sectional view taken along line 6—6 in FIG. 5.

Coatings 4 having heatproof characteristic and compressibility are applied to bead portions at areas W between the holes 2 for the cylinder bores. Namely, as shown in FIGS. 1 and 2(b), the coatings 4 are formed at the beads in the areas W while connecting the two coatings 4 at a narrow portion. In an embodiment as shown in FIGS. 3 and 4, the coatings 4 with two layers are formed at the beads in the areas W while connecting the two coatings at a wide portion. In an embodiment as shown in FIGS. 5 and 6, the coatings 4 are formed on the beads in the area W without a connection. The coatings may have a single layer or a plurality of layers.

Figure 7A:
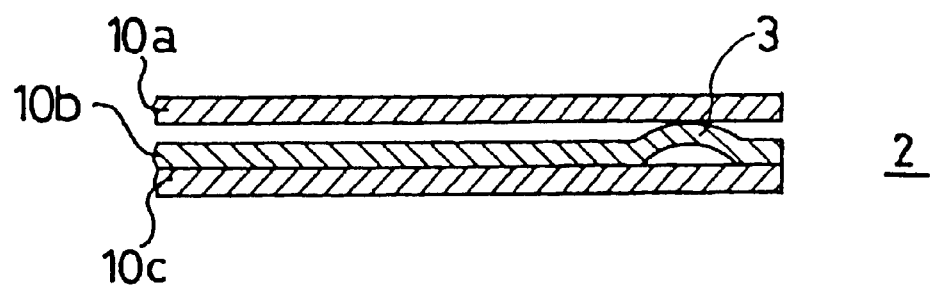
FIGS. 7(a) and 7(b) are enlarged sectional views of a fourth embodiment of the cylinder head gasket at portions corresponding to FIGS. 2(a) and 2(b), respectively.
Figure 7B:
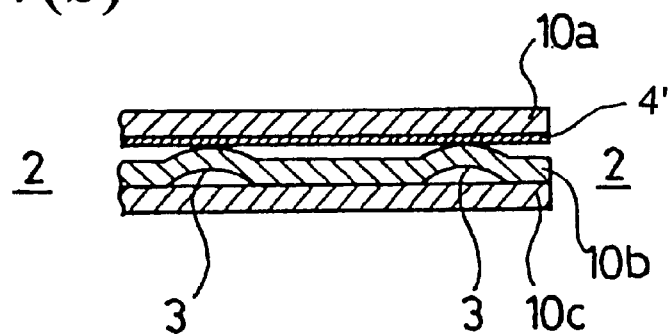
Figure 8:
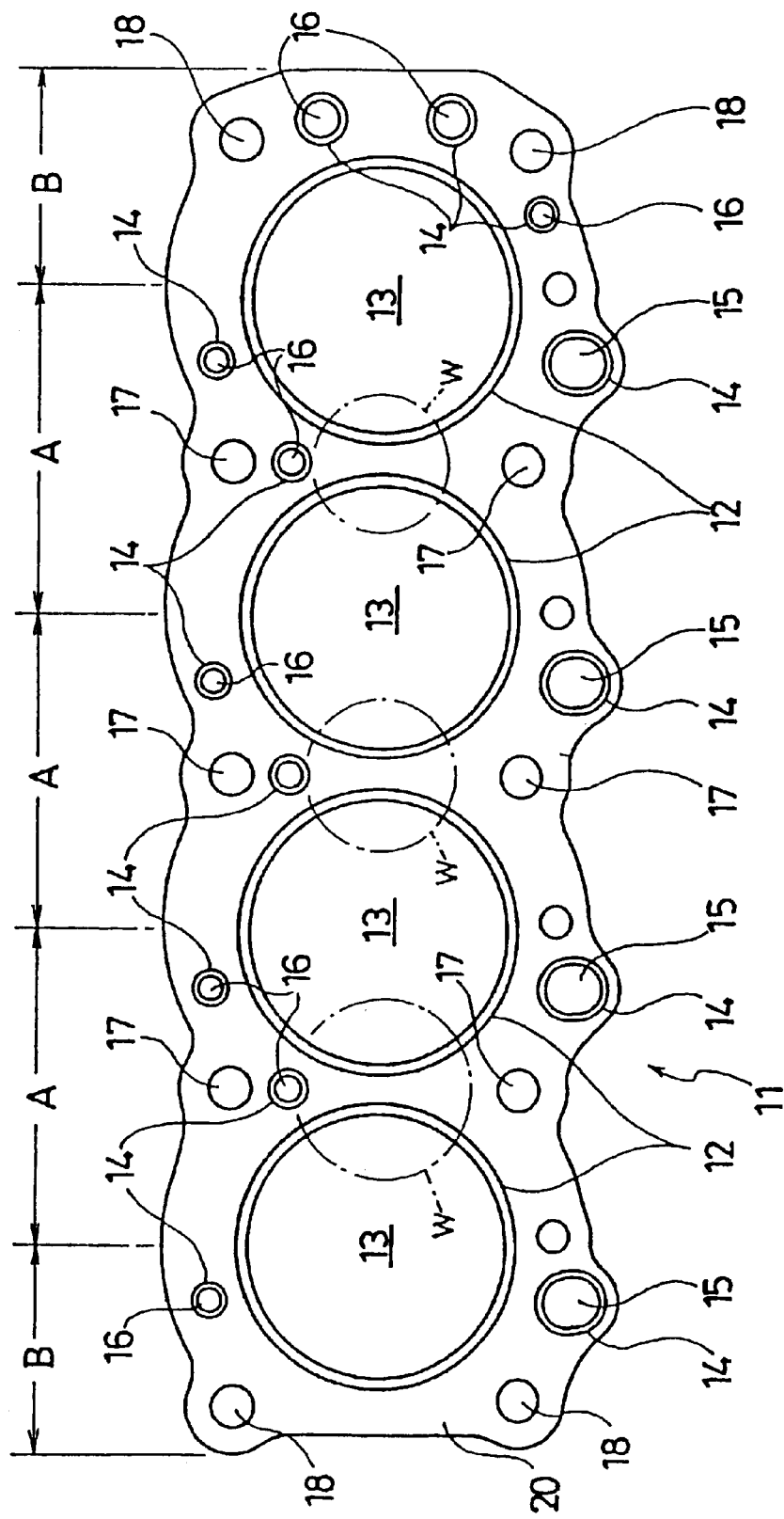
FIG. 8 is a plan view of a conventional cylinder head gasket.

In case the gasket is formed of one metal plate 10, as shown in FIGS. 2(b), 4 and 6, the coatings 4 are formed on the side of the projections of the beads 3. However, if the gasket is formed of a plurality of metal plates 10a, 10b, 10c, the coating 4' may be formed on the metal plate 10a contacting the bead 3 instead of the metal plate 10b, as shown in FIGS. 7(a) and 7(b). In this case, the coating 4' may be formed on the metal plate 10a at a side opposite to the bead 3 or on the metal plate 10c at a side opposite to the bead 3.

The base plate 10 for the gasket 1 may be formed of a hard metal plate, such as stainless steel or spring steel, or soft steel plate.

The seal coating 4 or 4' is formed to have a hardness and thickness such that when the coating is compressed, the coating is deformed but not damaged. The seal coating may be formed of epoxy resin, phenol resin, phenoxy resin, fluoroplastics and polyamideimido. The sealing coatings are formed at the desired shapes by screen printing. In view of the operation ability and physical characteristics, phenoxy resin is preferable. For example, the coating may have a hardness of F-6H in pencil hardness and a thickness of 5–150 μm, according to the kind and size of the engine.

If the viscosity of the coating material is low, the coating may be applied by spraying and so on. In case of printing, the thickness may be changed easily by multiple printing, so that the gasket can be manufactured easily.

Also, in order to absorb a tool mark and so on formed on the cylinder head and the cylinder block, a resilient coating formed of rubber material may be applied on the entire surface of the gasket including the coating 4. As the rubber type coating, it is preferable to have good durability and heatproof property relative to the combustion gas and liquid, i.e. oil and water, to be sealed, and also have softness and recovery ability for the compressing deformation. The material may be a rubber type material, such as NBR gum, fluorine rubber, silicone rubber, hydrogen added nitrilebutadiene rubber.

In the gasket 1 for the multiple cylinder bores, the coatings 4 are formed on the beads 3 between the holes 2 for the cylinder bores. Therefore, the surface pressure is reinforced at the area W where the tightening pressure is relatively low, and it is possible to provide the sealing pressure at the area W of the beads 3 located between the holes 2 for the cylinder bores with substantially the same sealing pressure of the bead 3 outside the area W.

Namely, in the inner area A, the area for tightening by one bolt in the bolt hole 5 is greater than the area for tightening by one bolt disposed in the bolt hole 6 in the end area B. The initial pressure for the beads 3 at the area between the holes 2 for the cylinder bores is low. However, since the surface pressures are increased by the thickness of the coatings 4, the sealing ability at the area W is improved. Also, since the beads 3 at the area W are protected by the compressibility of the coatings 4, the creep relaxation and damage of the beads 3 can be prevented.

Also, in the invention, a sealing pressure applied to the area W between the holes 2 for the cylinder bores can be increased without requiring a large tightening pressure, so that large sealing pressures need not be applied to the beads 3 at the end areas B. Therefore, the creep relaxation and damage of the beads 3 at the end areas B can be prevented to thereby improve the durability.

As explained above, in accordance with the cylinder head gasket for the multiple cylinders, the following advantages can be obtained. Namely, since the coatings are applied to the portions of the beads 3 adjacent to each other between the holes for the cylinder bores, the surface pressure can be reinforced at the portions where the tightening pressure is relatively small. The sealing pressure which is substantially the same as that for the beads at the end areas can be applied to the beads at the area between the holes for the cylinder bores.

Also, since the bead can be protected by the compressibility of the coating, the creep relaxation of the bead and the damage thereof can be prevented.

Further, since the sealing pressures applied to the beads at the area between the holes for the cylinder bores can be increased without requiring the large tightening force, large sealing pressures need not be applied to the beads at the end areas. Therefore, the creep relaxation and the damage of the beads at the end areas can be prevented.

Therefore, the surface pressure can be reinforced at the area between the holes for the cylinder bores where the sealing pressures are likely to decrease, to thereby provide the cylinder head gasket with improved sealing ability and durability.

In comparing with an auxiliary bead and a shim located inside or outside the bead, the coating can be coated repeatedly at the bead, so that the coating can be provided easily for the head gasket with the limited areas. Also, in comparing with the processing for the shim, since the coating can be easily applied by printing or spraying, the management of the parts and processing can be made easily. Also, the steps for manufacturing the gasket can be decreased and the manufacturing cost can be reduced.

While the invention has been explained with reference to the specific embodiments of the invention, the explanation is illustrative, and the invention is limited only by the appended claims.

What is claimed is:

1. A cylinder head gasket for an internal combustion engine with a plurality of cylinder bores, comprising:

a first metal plate extending substantially throughout an entire area to be sealed, said first metal plate having a plurality of holes corresponding to the cylinder bores of the engine, a plurality of beads surrounding the respective holes, and at least one area situated between the holes adjacent to each other, and seal coatings directly deposited on the beads in only said at least one area without covering parts on the beads outside the at least one area, said seal coatings having heatproof characteristic and compressibility to strengthen surface pressures of the beads at the at least one area.

2. A cylinder head gasket according to claim 1, wherein said seal coatings deposited on the beads and located adjacent to each other are integrally connected together as one unit.

3. A cylinder head gasket according to claim 2, wherein said seal coatings are entirely deposited on the first metal plate on and between the beads in said at least one area.

4. A cylinder head gasket according to claim 3, further comprising a second metal plate disposed on the first metal plate at a side where the beads project.

5. A cylinder head gasket according to claim 3, wherein said seal coating is selected from the group consisting of epoxy resin, phenol resin, phenoxy resin, fluoroplastics and polyamideimido.

6. A cylinder head gasket according to claim 1, wherein each of said bears projects outwardly from the first metal plate at a position away from an edge of each of the holes.

7. A cylinder head gasket according to claim 6, wherein said seal coatings are partially deposited on the beads located in the at least one area.

* * * * *

UNITED STATES PATENT AND TRADEMARK OFFICE
CERTIFICATE OF CORRECTION

PATENT NO.   : 6,517,084 B2                                                                Page 1 of 1
DATED        : February 11, 2003
INVENTOR(S)  : Susumu Inamura It is certified that error appears in the above-identified patent and that said Letters Patent is hereby corrected as shown below:

<u>Column 6,</u>
Line 41, change "bears" to -- beads --.

Signed and Sealed this

Eighth Day of April, 2003

JAMES E. ROGAN
*Director of the United States Patent and Trademark Office*